(12) United States Patent
Osada et al.

(10) Patent No.: US 6,974,378 B2
(45) Date of Patent: Dec. 13, 2005

(54) VENTILATOR

(75) Inventors: Hidehiko Osada, Fuji (JP); Mitsuaki Fujita, Fuji (JP)

(73) Assignee: Nihon Plast Co., Ltd., Fuji (JP)

( * ) Notice: Subject to any disclaimer, the term of this patent is extended or adjusted under 35 U.S.C. 154(b) by 0 days.

(21) Appl. No.: 10/611,636

(22) Filed: Jun. 30, 2003

(65) Prior Publication Data

US 2004/0002298 A1 Jan. 1, 2004

(30) Foreign Application Priority Data

Jun. 28, 2002 (JP) .................................... P2002-190592
Oct. 28, 2002 (JP) .................................... P2002-312804

(51) Int. Cl.[7] ................................................ B60H 1/34
(52) U.S. Cl. .................... 454/155; 454/315; 454/318; 454/320
(58) Field of Search ........................... 454/155, 202, 454/315, 318, 320

(56) References Cited

U.S. PATENT DOCUMENTS

| | | | | |
|---|---|---|---|---|
| 2,142,616 A | * | 1/1939 | Otto | 49/101 |
| 2,614,301 A | * | 10/1952 | Axtell | 49/71 |
| 2,743,796 A | * | 5/1956 | Focht et al. | 49/80.1 |
| 3,110,936 A | * | 11/1963 | Oreste | 49/91.1 |
| 4,699,322 A | | 10/1987 | Jobst | |
| 5,769,709 A | * | 6/1998 | Kim | 454/318 |
| 5,810,659 A | * | 9/1998 | Kim | 454/233 |
| 6,652,371 B2 | * | 11/2003 | Kamio | 454/155 |

FOREIGN PATENT DOCUMENTS

| | | | |
|---|---|---|---|
| GB | 623828 | 5/1949 | |
| GB | 660456 | 11/1951 | |
| JP | 58-97515 | * 6/1983 | ............ 454/318 |
| JP | 61-191414 | * 8/1996 | ............ 454/155 |
| JP | 2001-158226 | 6/2001 | |

* cited by examiner

*Primary Examiner*—Harold Joyce
(74) *Attorney, Agent, or Firm*—Brenda O. Holmes; Kilpatrick Stockton LLP

(57) ABSTRACT

A ventilator includes: a plurality of louvers arranged in parallel from one end to the other end of one direction at a supply opening formed in a case; shaft pins respectively formed on both ends at one ends of the louvers and inserted into a plurality of shaft holes; the operation pins being inserted into a plurality of operation holes formed along a longitudinal direction of a link with predetermined intervals; and a standard louver being opened and closed with the shaft pins serving as a center of opening and closing, wherein, gaps (A) between the operation holes on the link are set so as to be larger than gap (B) between a line connecting the shaft pins of the standard louver and the operation pin.

10 Claims, 14 Drawing Sheets

VENTILATOR

BACKGROUND OF THE INVENTION

1. Field of the Invention

The present invention relates to a ventilator arranged at a supply opening of a case, and particularly relates to the ventilator which is capable of heightening the degree of shielding in a fully closed state by means of louvers at the supply opening.

2. Description of the Related Art

Conventionally in an automobile or the like mounted with an air adjusting device, a case whose supply opening faces an inside of a car is provided on an instrument panel or the like. The supply opening of the case has a ventilator for adjusting a wind direction. The similar art to this includes a ventilator disclosed in Japanese Patent application Laid-Open Publication No. 2001-158226.

This kind of ventilator has a structure such that a plurality of louvers, which freely open and close with shaft pins formed on their one ends serving as centers of the opening and closing, are arranged in parallel at the supply opening. One louver which is positioned in the endmost portion is used as a standard louver, and this standard louver is opened/closed. Operation force of the standard louver is transmitted to another louvers via a link. When the standard louver is operated to a closing direction, the other louvers are brought into a fully closed state in which the supply opening is shielded in an interlocking manner. When the standard louver is operated to an opening direction, the standard louver and the other louvers are brought into an opened state in which they face an air supply direction.

In the fully closed state, the other ends of the louvers come into contact with the one ends of the adjacent louvers successively starting from the louver on the inner side of the supply opening, so that an air passage in the case is shielded. For this reason, when the perfectly fully closed state is obtained, an air dumper for shielding air is not necessary. Therefore, a number of parts and is a number of the assembly steps are reduced.

In such a prior art, however, since the fully closed state of the supply opening is such that the other ends of the louvers are simply brought into contact with the one ends of the adjacent louvers, the other ends of the louvers do not perfectly come into contact with the one ends of the adjacent louvers because of an error of a dimension at the time of manufacturing the louvers, a change in the dimension of the louvers caused by a change in temperature after the assembly, and the like. As a result, there is a concern of a gap being generated.

SUMMARY OF THE INVENTION

It is, therefore, an object of the present invention to provide a ventilator which is capable of obtaining a more perfectly fully closed state of a supply opening.

To achieve the object, according to a first aspect of the present invention there is provided a ventilator, comprising: a case formed with a supply opening, the case having walls opposite to each other formed respectively with a plurality of shaft holes arranged with predetermined intervals; an operating louver having two longitudinal margins opposite to each other and two ends opposite to each other, each one of the two ends of the operating louver provided with a shaft pin respectively being inserted into the shaft hole, one end of the two ends of the operating louver provided with an operating pin; a train louver having two longitudinal margins opposite to each other and two ends opposite to each other, each one of the two ends of the train louver provided with a shaft pin respectively being inserted into the shaft hole, one end of the two ends of the train louver provided with another operating pin; and a link formed with a plurality of operation holes receiving the operating pin of the operating louver and the operating pin of the train louver, the link transmitting motion of the operating louver to the train louver so that the operating louver and the train louver jointly shut the supply opening at swing limit of the operating louver in a manner such that the one margin of the operating louver and the one margin of the train louver meet each other, wherein a biasing device biasing the meeting state of the operating louver and the train louver so that clearance between the operating louver and the train louver is reduced at the swing limit of the operating louver.

According to the structure of the first aspect, the ventilator is capable of obtaining a more perfectly fully closed state of a supply opening.

According to a second aspect of the present invention, as it depends from the first aspect, there is provided a ventilator wherein gaps (A) between the operation holes on the link are set so as to be larger than gap (B) between a line connecting the shaft pins of the operating louver and the operation pin (A>B).

In the structure according to the second aspect, since the gaps (A) relating to the turning the other louvers are set so as to be larger than gap (B) relating to the turning of the operating louver, before the operating louver is closed perfectly, the other end of the louvers abut against the one ends of the adjacent louvers. Therefore, operation force for closing the operating louver thereafter serves as force for pushing the other ends of the louvers against the one ends of the adjacent louvers. Even if the dimension has a slight error, since the louvers are in a pushed state, a gap is not generated between the louvers.

According to a third aspect of the present invention, as it depends from the second aspect, there is provided a ventilator wherein a stopper unit for holding a turning position of the operating louver in the fully closed state by means of predetermined force is provided between the operating louver or the link and the inner wall of the supply opening.

In the structure according to the third aspect, the stopper unit holds a turning position of the operating louver in the fully closed state and can continuously apply a pushing force to the other louvers, so that the louvers can withstand wind pressure.

According to a fourth aspect of the present invention, as it depends from one aspect among the first aspect to the third aspect, there is provided a ventilator wherein the other margins of the louvers are bent into a crank shape; and surfaces of the louvers in the fully closed state form a continuous surface.

In the structure according to the fourth aspect, since the other ends of the louvers are bent into the crank shape, the surfaces of the louvers in the fully closed state form a continuous surface, so that a deign effect is heightened.

According to a fifth aspect of the present invention, as it depends from one aspect among the first aspect to the fourth aspect, there is provided a ventilator wherein the supply opening is curved in the longitudinal direction, and lengths of the operation holes formed on the link become longer in the air supply direction gradually from other end to the one end in the longitudinal direction except for the operation hole relating to the operating louver.

In the structure according to the fifth aspect, even if the supply opening of the case is curved, the operation pins of the louvers move by an approximately same quantity, so that parallel wind can be supplied with the louvers facing the approximately uniform direction in the opened state of the supply opening.

According to a sixth aspect of the present invention, as it depends from the first aspect, there is provided a ventilator wherein the biasing device includes: a stopper pin is formed on one end of the louvers opposite to the operation pins; and an elastic piece whose tip comes in elastically contact with the stopper pin in the fully closed state of the louvers is formed on an inner wall corresponding to the stopper pin.

According to a seventh aspect of the present invention, as it depends from the first or sixth aspect, there is provided a ventilator wherein a guide surface for pushing the stopper pin to a closing direction by means of elastic force is formed on a portion at the tip of the elastic piece which comes in elastically contact with the stopper pin.

In the structure according to the seventh aspect of the invention, the stopper pin comes into elastically contact with the guide surface at the tip of the elastic piece, so that the elastic force of the elastic piece serves as the force for pushing the stopper pin of the louver to the closing direction. The pushing force is transmitted also to the other louvers via the link. Even if, therefore, the louvers have a slight dimensional error, a gap is not generated between the louvers in the fully closed state. The elastic contact between the stopper pin and the elastic piece serves also as a stopper unit, and the turning position of the louvers in the fully closed state is held so that the louvers can withstand wind pressure.

According to an eighth aspect of the present invention, as it depends from the first, sixth or seventh aspect, there is provided a ventilator wherein the tip of the elastic piece has a curved side surface; and the curved side surface on a side which is more approximate to a closing direction than an apex which is the farthest from the shaft pin is the guide surface.

In the structure according to the eighth aspect, since the guide surface is set on the curved side surface at the tip of the elastic piece so as to continue with another portions, smooth elastic sliding between the stopper pin and the elastic piece does not greatly change, and operability of the standard louver is satisfactory.

According to a ninth aspect of the present invention, as it depends from one aspect among the first aspect or the sixth aspect to eighth aspect, there is provided a ventilator wherein the stopper pin is formed on the train louver which is the farthest from the operating louver.

In the structure according to the ninth aspect, since the stopper pin is formed on the louver which is the farthest from the operating louver and the stopper pin pulls the link to the closed direction, a gap can be prevented the most securely from being generated between the louvers in the fully closed state.

According to a tenth aspect of the present invention, as it depends from one aspect among the first aspect or the sixth aspect to ninth aspect, there is provided a ventilator wherein ribs are formed on the other ends of the louvers curved into a crank shape, respectively; and the ribs come into contact with the one ends of the louvers adjacent to the other ends and so as to make surfaces of the louvers in the fully closed state as a continuous surface.

In the structure according to the tenth aspect, since the ribs for keeping the surfaces of the louvers in the fully closed state as a continuous surface are formed on the other ends of the louvers, an overstroke, such that the other ends of the louvers excessively turns to the closing direction and exceeds the continuous surface, can be prevented.

According to an eleventh aspect of the present invention, as it depends from one aspect among the first aspect or the sixth aspect to tenth aspect, there is provided a ventilator wherein the supply opening is curved in its longitudinal direction; and the operation holes formed on the link are oval holes whose lengths become longer in an air supply direction gradually from the hole on the other end to the hole on the one end in the longitudinal direction except for the operation hole relating to the operating louver.

In the structure according to the eleventh aspect, even if the supply opening of the case is curved, since the operation pins of the louvers move by the approximately same quantity, parallel wind can be supplied with the louvers facing an approximately uniform direction in the opened state of the supply opening.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
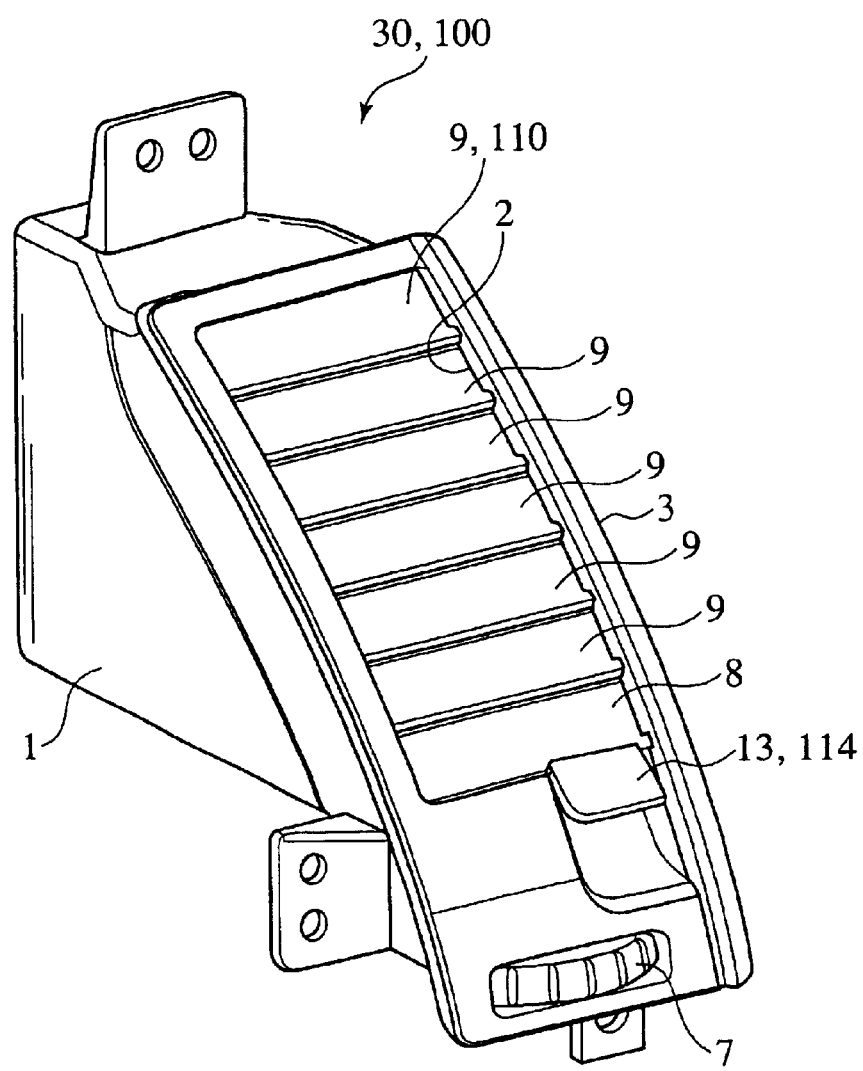
FIG. 1 is a perspective view showing a ventilator according to a first embodiment of the present invention.
Figure 2:
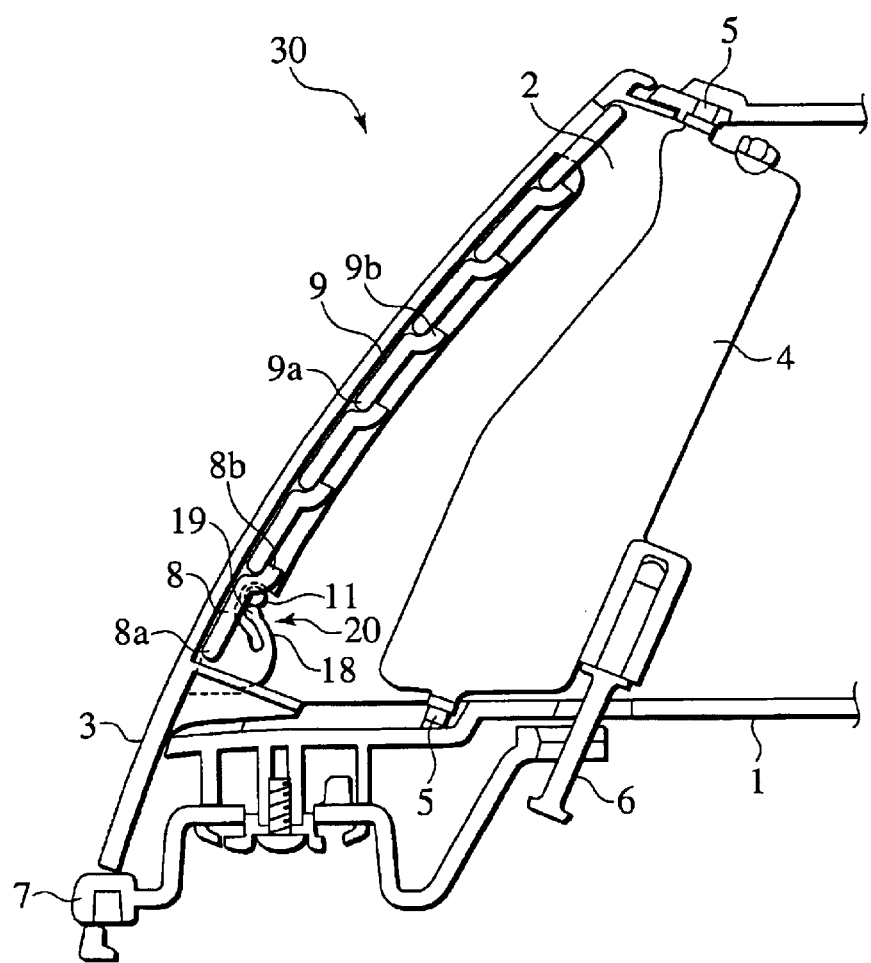
FIG. 2 is a sectional view showing the ventilator in a fully closed state.
Figure 3:
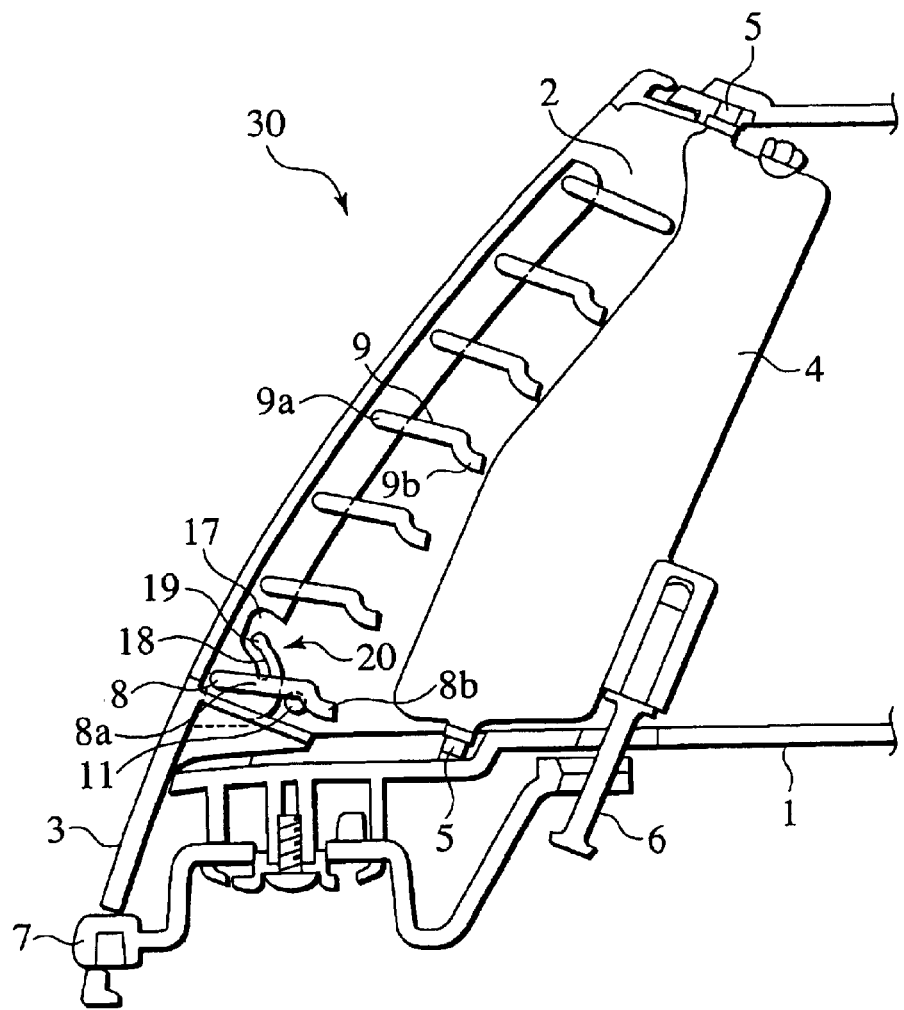
FIG. 3 is a sectional view showing the ventilator in an opened state.
Figure 4:
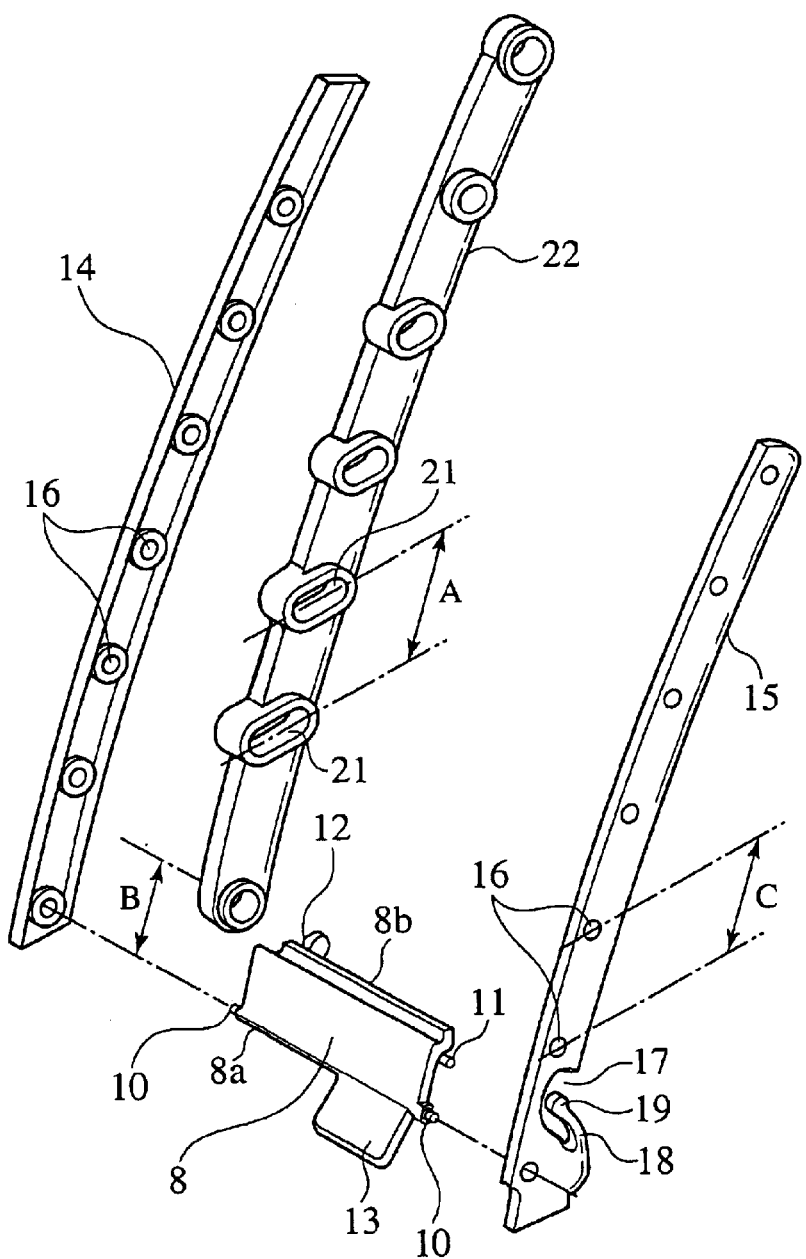
FIG. 4 is a perspective view showing a standard louver, a link and spacers.
Figure 5:
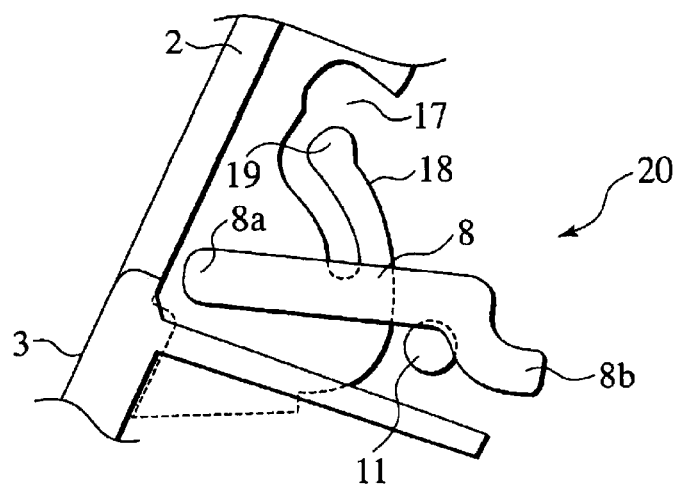
FIG. 5 is an enlarged diagram showing a stopper unit in the opened state.
Figure 6:
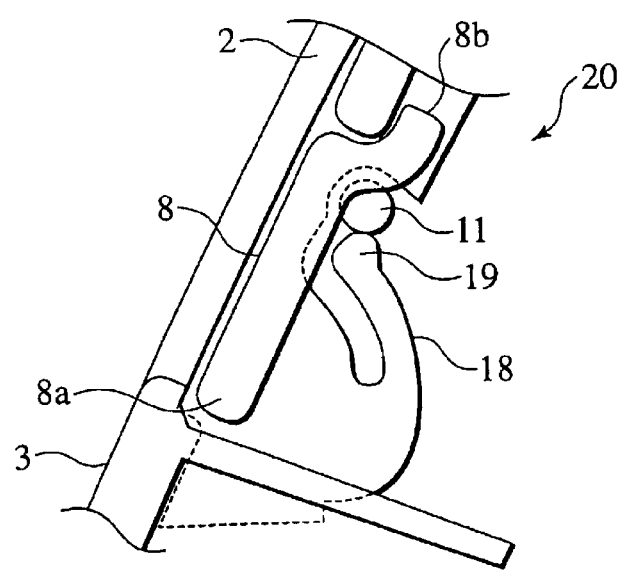
FIG. 6 is an enlarged diagram showing the stopper unit in the fully closed state.
Figure 7:
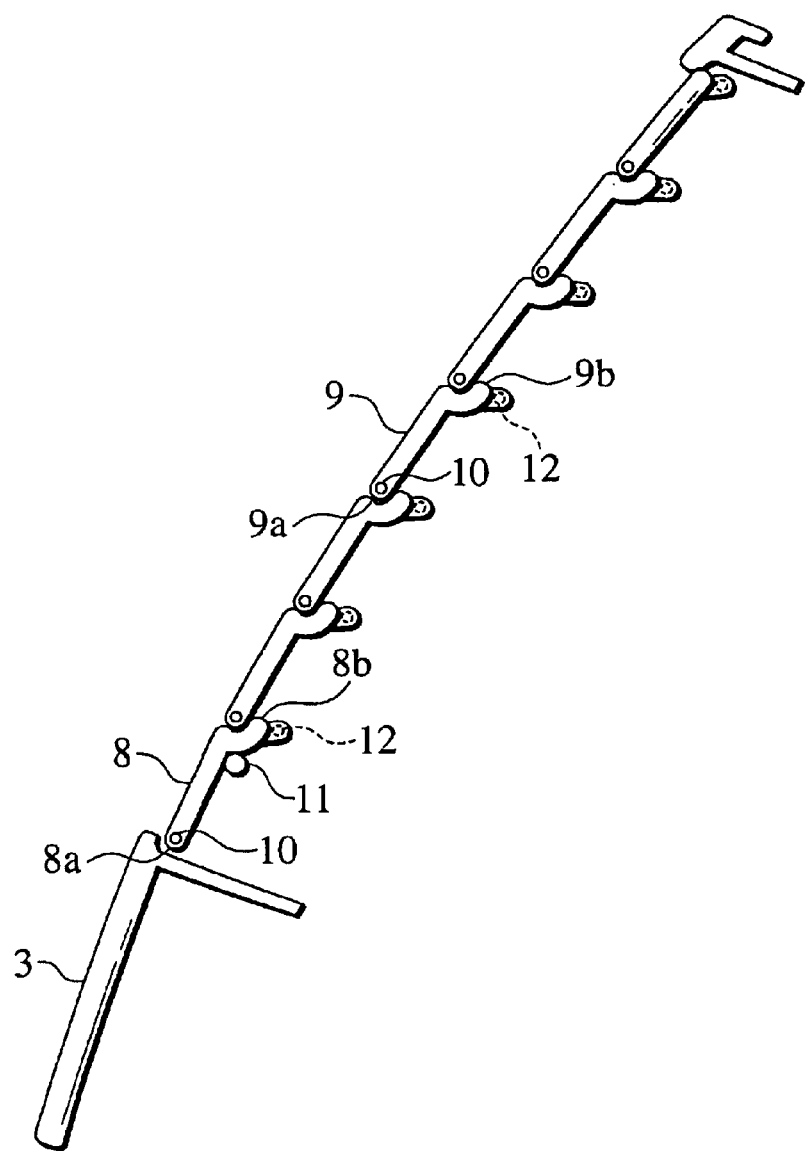
FIG. 7 is a side view showing the louvers in the fully closed state.

There will be detailed below the preferred embodiments of the present invention with reference to the accompanying drawings. Like members are designated by like reference characters.

FIGS. 1 to 7 are diagrams showing a first embodiment of the present invention. FIG. 1 shows a perspective view of the ventilator 30 according to the present invention. A case 1 has a square cylindrical shape having a long section in an up-down direction (longitudinal direction), and it is provided on a right side of an instrument panel of an automobile, not shown (another case is provide on its left side). The case 1 has a supply opening 2 that is curved to an inside of a car in the up-down direction, and a cover 3 is mounted to a periphery of the supply opening 2.

A louver 4 of a lengthwise direction is provided inside the case 1. The louver 4 freely turns left and right about upper and lower fulcrums 5 so as to change an air supply direction from left to right. A shaft 6 is provided on an inner side of the louver 4, and the shaft 6 is engaged with a part of an operation dial 7 exposed from the cover 3. The operation dial 7 is rotated, so that the louver 4 can be turned left and right.

Seven louvers 8, 9 of a lateral direction are provided at the supply opening 2 along the up-down direction. One ends 8a, 9a of the louvers 8, 9 has shaft pins 10 which protrudes to a left-right direction (widthwise direction). Other ends 8b, 9b of the louver 8, 9 are bent into a crank shape towards an inner side of the supply opening 2 (but except for the uppermost louver 9).

A stopper pin 11 is formed on a position on the right end of the louver 8 approximate to the other end 8b so as to protrude to the right side. An operation pin 12 is formed on left ends at the other ends 8b, 9b of the louvers 8, 9 so as to protrude to the left side.

The lowermost louver of the seven louvers 8, 9 is a standard louver 8 or operating louver 8, and the other louvers 9 are normal louvers, train louvers 9 or operated louvers 9 swung by swing motion of the standard louver 8. And an operation section 13 is formed on the one end 8a of only the standard louver 8.

An inner wall as a wall at the supply opening 2 of the case 1 is formed by spacers 14, 15. Seven shaft holes 16 are formed on the spacers 14, 15, respectively, along their longitudinal directions. Shaft pins 10 of the louvers 8, 9 are inserted into the shaft holes 16, respectively, so that the louvers 8, 9 are mounted turnably about the shaft pins 10. FIGS. 2, 3, 5, 6 and the like are diagrams viewed from the spacer 15, but in order to clarify a relationship between the spacer 15 and the louvers 8, 9, the louvers 8, 9 are shown on a front side.

Gaps (C) between the shaft holes 16 are equal with each other and the gap (C) is approximately equal with a gap (B) between a line connecting the shaft pins 10 on the standard louver 8 and the operation pin 12. When the louvers 8, 9 are turned, the other ends 8b, 9b of the louvers 8, 9 are overlapped with the one end 9a of the adjacent louvers 9 successively from the inner side of the supply opening 2.

A concave portion 17 is formed between the lowermost shaft hole 16 on the right spacer 15 and the shaft hole 16 above the lowermost shaft hole 16, and one side of the concave portion 17 is formed by an elastic piece 18. A tip 19 of the elastic piece 18 is slightly separated from a bottom portion of the concave portion 17. The stopper pin 11 of the standard louver 8 is engaged with the concave portion 17, and the stopper pin 11 and the elastic piece 18 form a stopper unit 20 of this embodiment. The stopper unit 20 can be held not only by elastic force but also by frictional force.

The left side of the louvers 9 is provided with a link 22 having seven operation holes 21 along the longitudinal direction. The operation pins 12 of the louvers 8, 9 are inserted into the operation holes 21, respectively, so that the seven louvers 8, 9 are turned in an interlocking manner. The operation holes 21 of the link 22 are oval holes in which their lengths become longer gradually from the upper hole in an air supply direction except for the lowermost hole relating to the standard louver 8. The operation holes 21 may be, however, longer gradually from the lower hole to the upper hole in the air supply direction except for the lowermost hole. Gaps (A) between the operation holes 21 on the link 22 are equal with each other, and they are set to be larger than the gap (B) between the line connecting the shaft pins 10 of the standard louver 8 and the operation pin 12 (A>B).

The operation of this embodiment will be explained below. When the louvers 8, 9 are opened, the operation section 13 of the standard louver 8 on the lowermost position is held by a hand so as to be lifted up. As a result, the standard louver 8 is turned about the shaft pins 10, and the other end 8b of the standard louver 8 is lowered so that the standard louver is opened. When the standard louver 8 is turned, the other louvers 9 which are linked with the louver 8 via the link 22 turn in the interlocking manner, so that all the louvers 8, 9 are opened.

Even if the supply opening 2 is curved in the up-down direction, since the operation holes 21 of the link 22 are the oval holes as mentioned above, the operation pins 12 of the louvers 9 move by the uniform quantity. In the state in which the supply opening 2 is opened, the louvers 9 face an approximately uniform direction. Parallel wind can be, therefore, supplied to the inside of the car from the supply opening 2 in the opened state.

When the louvers 8, 9 are closed, the operation section 13 of the standard louver 8 is held by the hand so as to be lowered. As a result, the standard louver 8 turns about the shaft pins 10, and the other end 8b of the standard louver 8 lifts up so that the standard louver 8 is closed. When the standard louver 8 turns, the other louvers 9 which are linked with the louver 8 via the link 22 turn in the interlocking manner, so that all the louvers 8, 9 are brought into a fully closed state.

Particularly when the louvers 8, 9 are closed, since the gap (A) relating to the rotation of the louvers 9 is set so as to be larger than the gap B relating to the rotation of the standard louver 8, before the standard louver 8 is closed perfectly, the other ends 9b of the louvers 9 abut against the one ends 9a of the adjacent louvers 9.

Operation force for closing the standard louver 8 thereafter, therefore, serves as force for pushing the other ends 9b of the louvers 9 against the one ends 9a of the adjacent louvers 9. Even if the dimension has a slight error, a gap is not generated between the louvers 9. The standard louver 8 which is closed to the fully closed position is engaged with the tip 19 of the elastic piece 18 in the concave portion 17 of the stopper pin 11, so that the turning position of the standard louver 8 in the fully closed state is held, and the pushing force can be continuously applied to the other louvers 9.

When the louvers 8, 9 are again brought into the opened state, the operation section 13 of the standard louver 8 is moved upward, so that the stopper pin 11 exceeds the tip 19 of the elastic piece 18 and the holding state of the standard louver 8 on the fully closed position is released.

In the embodiment, since the other ends 8b, 9b of the louvers 8, 9 are bent into a crank shape, the surfaces of the louvers 8, 9 in the fully closed state form a continuous surface, and thus this makes a good appearance.

Figure 8:
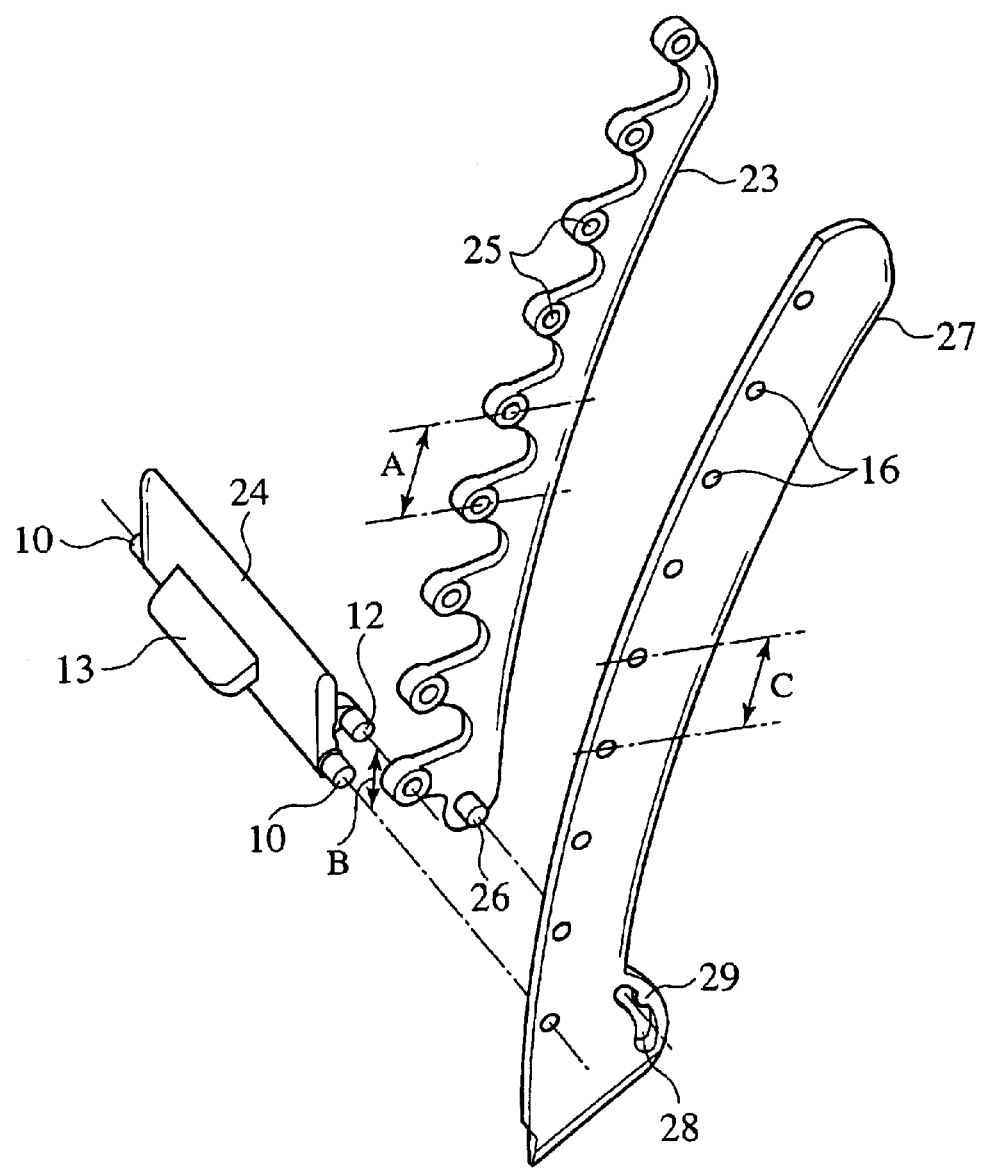
FIG. 8 is a perspective view showing the standard louver, the link and the spacers according to a second embodiment of the present invention.

FIG. 8 is a diagram showing a second embodiment of the present invention. In this embodiment, the link 23 is arranged on the right side of a standard louver 24 and the other louvers (not shown). The operation holes 25 of the link 23 has a circular shape and they are not the oval holes unlike the first embodiment. The gap (A) between the operation holes 25 of the link 23 and the other dimensional relationship are similar to those in the first embodiment.

The stopper pin 26 is formed not on the standard louver 24 but on a corresponding position of the link 23. The right spacer 27 is formed with an arc-shaped notch 28 into which the stopper pin 26 of the link 23 is inserted movably, and the inside of the notch 28 has a protrusion 29 which can deforms elastically. The fully closed position of the standard louver 24 is, therefore, held by engaging the stopper pin 26 of the link 23 with the protrusion 29 in the notch 28. In this embodiment, since the operation holes 25 of the link 23 are not the oval holes, the louver 24 and the like in the opened state have a diffusion angle at which they are opened up and down, diffusion wind can be supplied from the supply opening in the opened state to the inside of the car. Since the other parts of the structure and the operation are similar to those in the first embodiment, like parts are designated by like numbers, and the overlapped explanation will be omitted.

In the above embodiments, the gaps (A) between the operation holes 21, 25 of the links 22, 23 are equal with each other, but the present invention is not limited to this, and the gaps (A) in which a gap is particularly and easily generated is set to be larger than the other gaps, or the gap (A), in which even a gap is not generated, does not have to be larger than the gap (B). The entire form including the cover 3 and the spacers 14, 15 has the arc shape which protrudes to a rear side of the automobile, but the entire form is not limited to this and may have a concave shape.

A third embodiment of the ventilator 100 according to the present invention will be explained below with reference to FIGS. 1 and 9 to 15.

Figure 9:
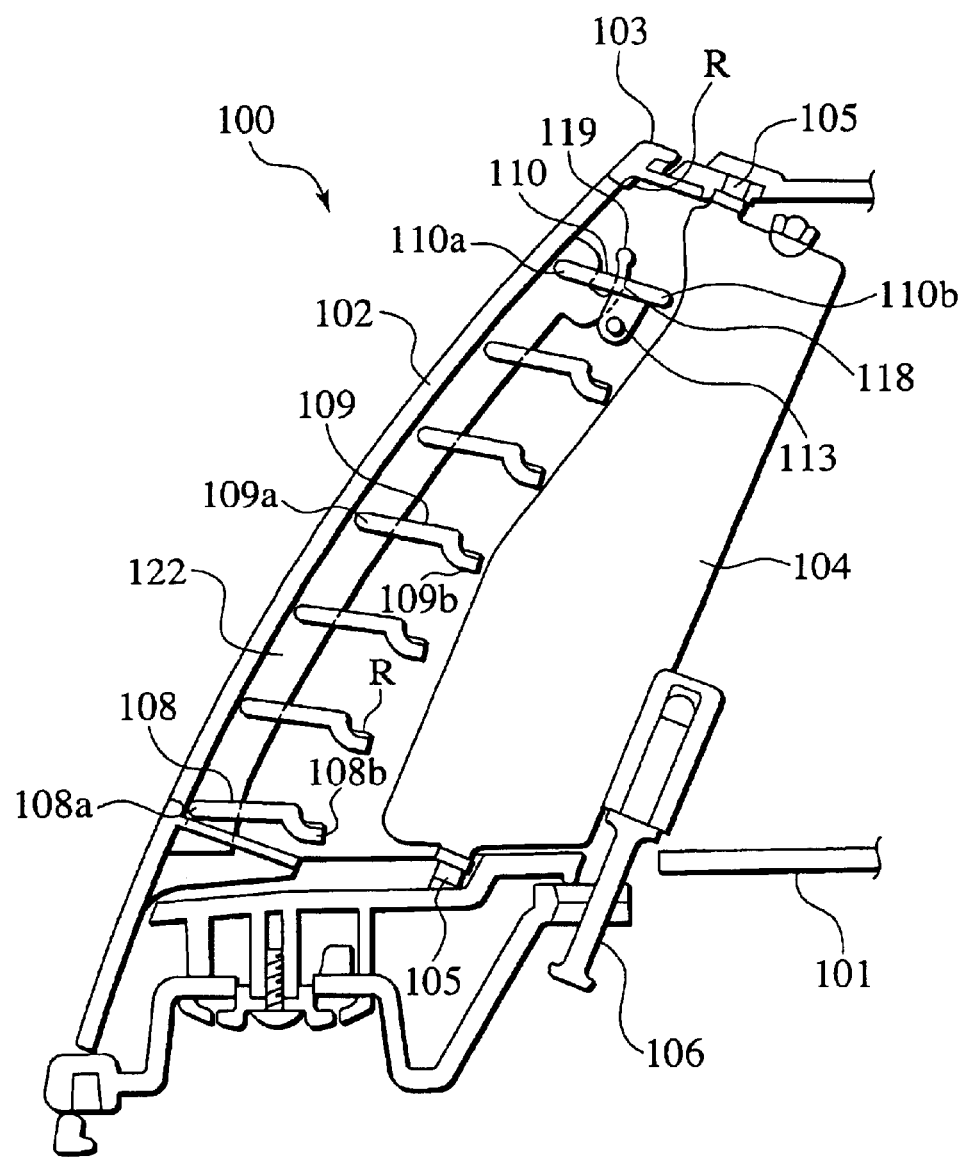
FIG. 9 is a sectional view showing the ventilator in the opened state according to a third embodiment of the present invention.

The louver 104 of the longitudinal direction is provided into the case 101 shown in FIG. 9. The louver 104 freely turns left and right about the upper and lower fulcrums 105, and changes the air supply direction left and right. The shaft 106 is provided on the inner side of the louver 104, and the shaft 106 is engaged with a part of the operation dial 107 exposed from a finisher 103. When the operation dial 107 is turned, the louver 4 can be turned left and right.

The seven louvers 108, 109, 110 of the lateral direction are provided at the supply opening 102 along the up-down direction. The shaft pins 111 which protrude to the left-right direction (widthwise direction) are formed on the one ends 108a, 109a, 110a of the louvers 108, 109, 110, respectively. The other ends 108b, 109b of the louvers 108, 109 are bent to the inside of the supply opening 102 so as to have the crank shape (except for the uppermost louver 101). A rib R is formed on the other ends 108b, 109b of the louvers 108, 109 and the upper ends of the finisher 103 so as to prevent any overstrokes and makes surfaces of the louvers 108, 109, 110 in the fully closed state as a continuous surface.

The operation pin 112 is formed on the left ends at the other ends 108b, 109b, 110b of the louvers 108, 109, 110 so as to protrude to the left side. The stopper pin 113 is formed on a position on the right end of the uppermost louver 110 approximate to the other end 110b so as to protrude to the right side.

The one of the seven louvers 108, 109, 110 which is positioned at the lowermost side is the standard louver 108, and the operation section 114 is formed on the one end 108a of only the standard louver 108.

Figure 10:
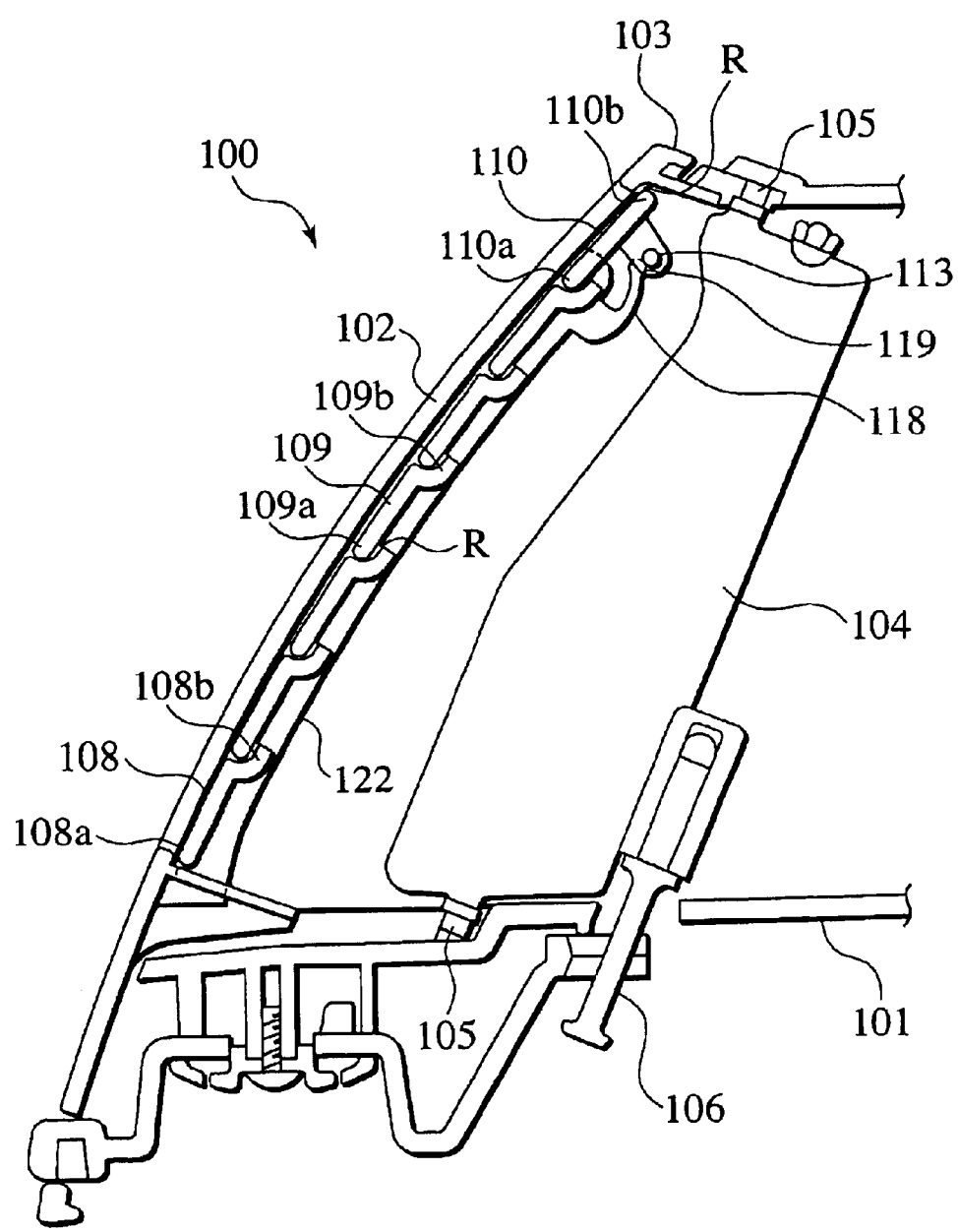
FIG. 10 is a sectional view showing the ventilator in the fully closed state.
Figure 11:
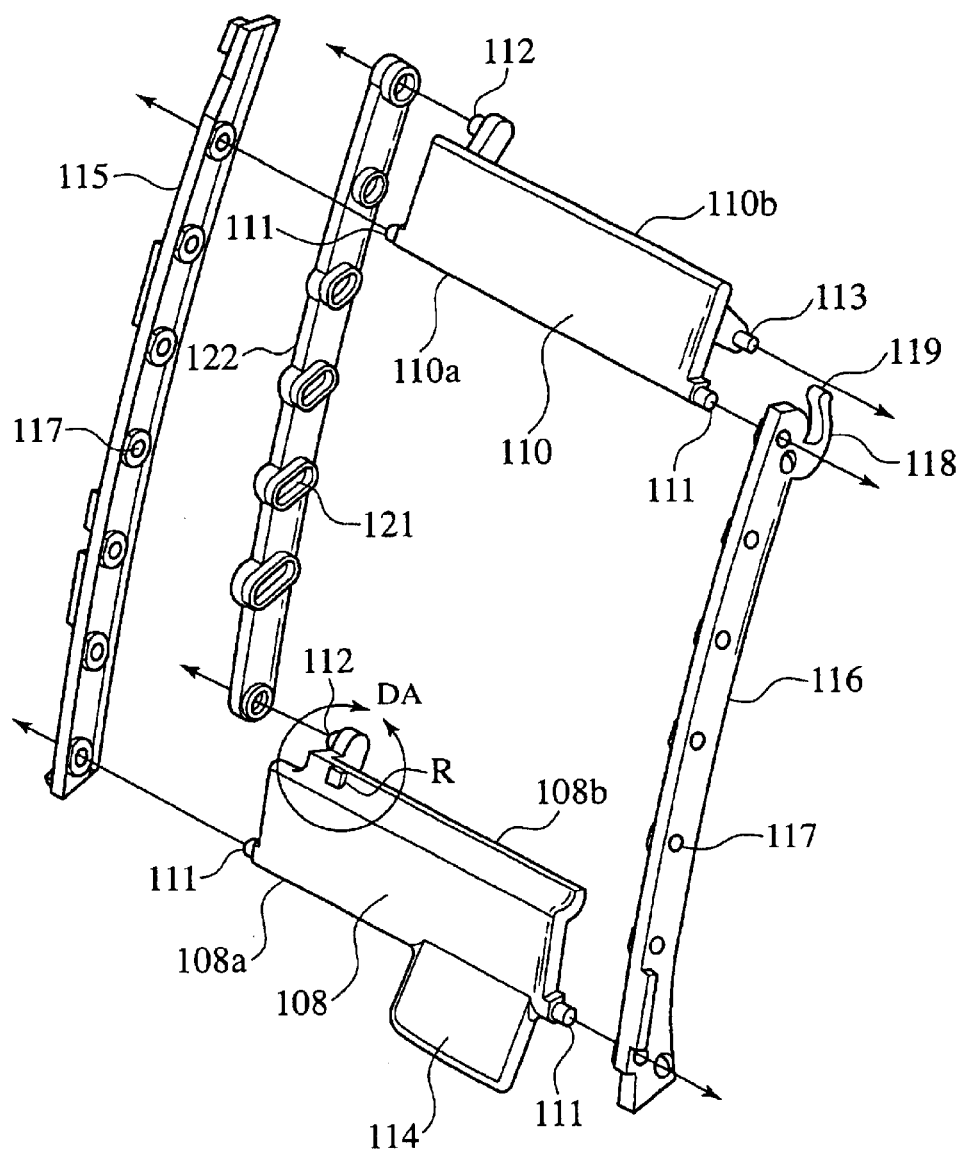
FIG. 11 is a perspective view showing the louvers, the link and the spacers.
Figure 12:
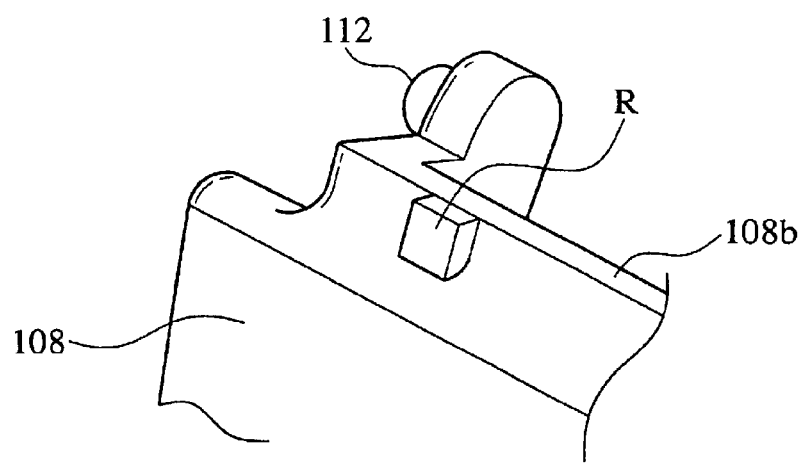
FIG. 12 is an enlarged diagram of a portion of an arrow DA in FIG. 11.
Figure 13:
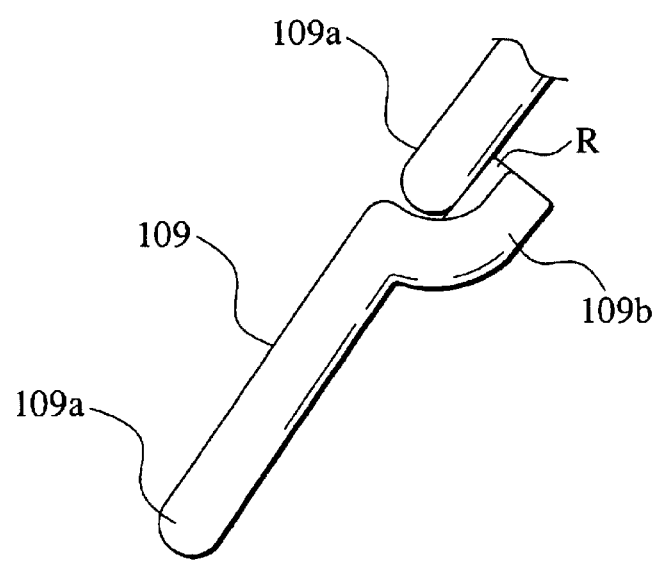
FIG. 13 is an enlarged diagram showing a contact state of a rib.

The inner wall of the supply opening 102 in the case 101 is formed by the spacers 115, 116. The seven shaft holes 117 are formed on the spacers 115, 116, respectively, along their longitudinal direction. The shaft pins 111 of the louvers 108, 109, 110 are inserted into the shaft holes 117, respectively, so that the louvers 108, 109, 110 are mounted turnably with the shaft pins 111 serving as the centers. FIGS. 9 and 10 are diagrams viewed from the spacer 116, but in order to clarify the relationship between the spacer 116 and the louvers 108, 109, 110, the louvers 108, 109, 110 are overlapped with the spacer 116.

Figure 14:
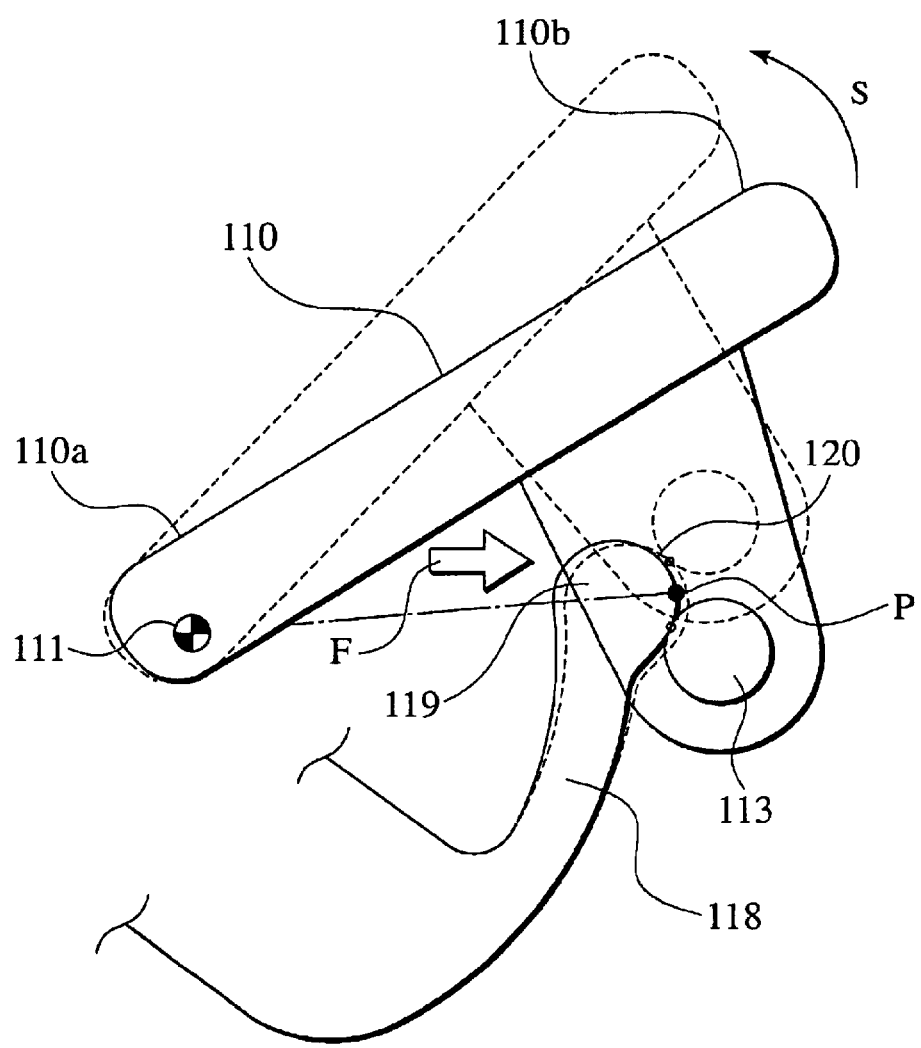
FIG. 14 is an enlarged sectional view showing a relationship between an elastic piece and a stopper pin.
Figure 15:
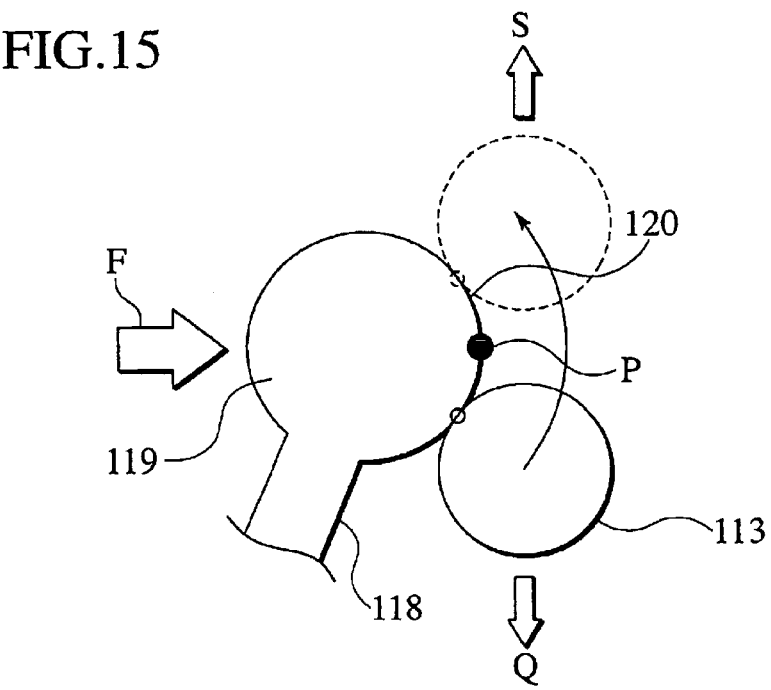
FIG. 15 is a schematic diagram showing working for generating pushing force on the stopper pin.

An elastic piece 118 which is curved upward to the inside of the supply opening 102 is formed on the upper end of the right spacer 116 corresponding to the stopper pin 113 formed on the uppermost louver 110. The tip 119 of the elastic piece 118 has a curved side surface of an approximately cylindrical shape. A portion of the curved side surface of the tip 119 above an apex P which is the farthest from the shaft pins 111 (on the side of the closing direction S) serves as the guide surface 120 as shown in FIG. 14.

The link 122 having the seven operation holes 121 along its longitudinal direction is provided on the left side of the louvers 108, 109, 110. The operation pins 112 of the louvers 108, 109, 110 are inserted into the operation holes 121, respectively, so that the seven louvers 108, 109, 110 turns in the interlocking manner. The operation holes 121 of the link 122 are the oval holes whose lengths become longer in the air supply direction gradually from the uppermost hole except for the lowermost hole relating to the standard louver 108.

The operation of this embodiment will be explained. When the louvers 108, 109, 110 are opened, the operation section 114 of the lowermost standard louver 108 is held by a hand so as to be lifted up. As a result, the standard louver 108 turns about the shaft pins 111, so that the other end 108b of the standard louver 108 lowers and the standard louver 108 is opened. When the standard louver 108 turns, the other louvers 109, 110 which are linked with the standard louver 108 via the link 122 turn in the interlocking manner, so that all the louvers 108, 109, 110 are opened (see FIG. 9).

The supply opening 102 of this embodiment is curved in the up-down direction, but since the operation holes 121 of the link 122 are the oval holes as mentioned above, the operation pins 112 of the louvers 109, 110 move by an approximately equal quantity. The louvers 109, 110 face the approximately uniform direction in the state in which the supply opening 102 is opened. Parallel wind can be, therefore, supplied from the supply opening 102 in the opened state to the inside of the car.

When the louvers 108, 109, 110 are closed, the operation section 114 of the standard louver 108 is held by a hand so as to be lowered. As a result, the standard louver 108 turns about the shaft pins 111, and the other end 108b of the standard louver 108 lifts up so that the standard louver 108 is closed. When the standard louver 108 turns, the louvers 109, 110 which are linked with the standard louver 108 via the link 122 turn in the interlocking manner, so that all the louvers 108, 109, 110 are brought into the fully closed state (see FIG. 10).

Particularly when the louvers 108, 109, 110 are in the fully closed state, the stopper pin 113 formed on the uppermost louver 110 is brought into elastically contact with the tip 119 of the elastic piece 118 formed on the upper end of the spacer 116. The stopper pin 113 comes in contact with a lower side of the curved side surface of the tip 119 according to the turning of the louver 110, and while deflecting the elastic piece 118 towards the supply opening 102, exceeds the apex P which is the farthest from the shaft pins 111 so as to reach the guide surface 120.

When the stopper pin 113 enters the guide surface 120, elastic force F of the elastic piece 118 serves as the force for pushing the stopper pin 113 of the louver 110 to the closing direction S (opposing direction to an opening direction Q as shown FIG. 15), so that the pushing force is transmitted to the louvers 109 via the link 122. That is to say, in this embodiment, since the entire link 122 is pulled upward by the pushing force, even if the louvers 108, 109, 110 have slight error in the dimension, a gap is not generated between the louvers 108, 109, 110 in the fully closed state.

The elastic contact between the stopper pin 113 and the elastic piece 118 serves also as the stopper unit and holds the turning position of the louvers 108, 109, 110 in the fully closed state, so that the louvers 108, 109, 110 can withstand wind pressure.

In this embodiment, the stopper pin 113 is formed on the uppermost louver 110 which is the farthest from the standard louver 108, and the stopper pin 113 pulls up the link 122 to the closing direction, so that a gap can be prevented the most securely from being generated between the louvers 108, 109, 110 in the fully closed state.

Since the guide surface 120 is set on the curved side surface of the tip 119 of the elastic piece 118 so as to continue with another portions, smooth elastic sliding between the stopper pin 113 and the elastic piece 118 does not greatly change. The operability of the standard louver 108 is, therefore, satisfactory.

Since the ribs R for maintaining the surfaces of the louvers 108, 109, 110 in the fully closed state as the continuous surface are formed on the other ends 108b, 109b of the louvers 108, 109 and the upper end of the finisher 103, respectively, the overstroke is prevented. The louvers 108, 109, 110 in the fully closed state, therefore, make a good appearance.

Figure 16:
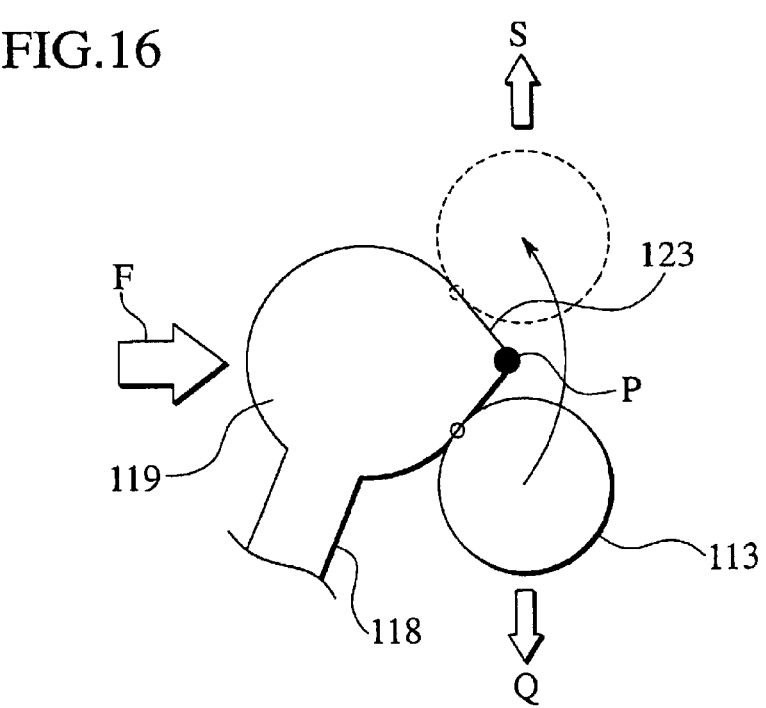
FIG. 16 is a schematic diagram showing the elastic piece according to a fourth embodiment.

FIG. 16 is a diagram showing a fourth embodiment of the present invention. As shown in the fourth embodiment, the guide surface 123 that is formed in a range exceeding the apex P may be a flat surface. In this case, the operation force of the operation section changes (clicking touch), and it can be known from touch that the stopper pin 113 exceeds the apex P.

Figure 17:
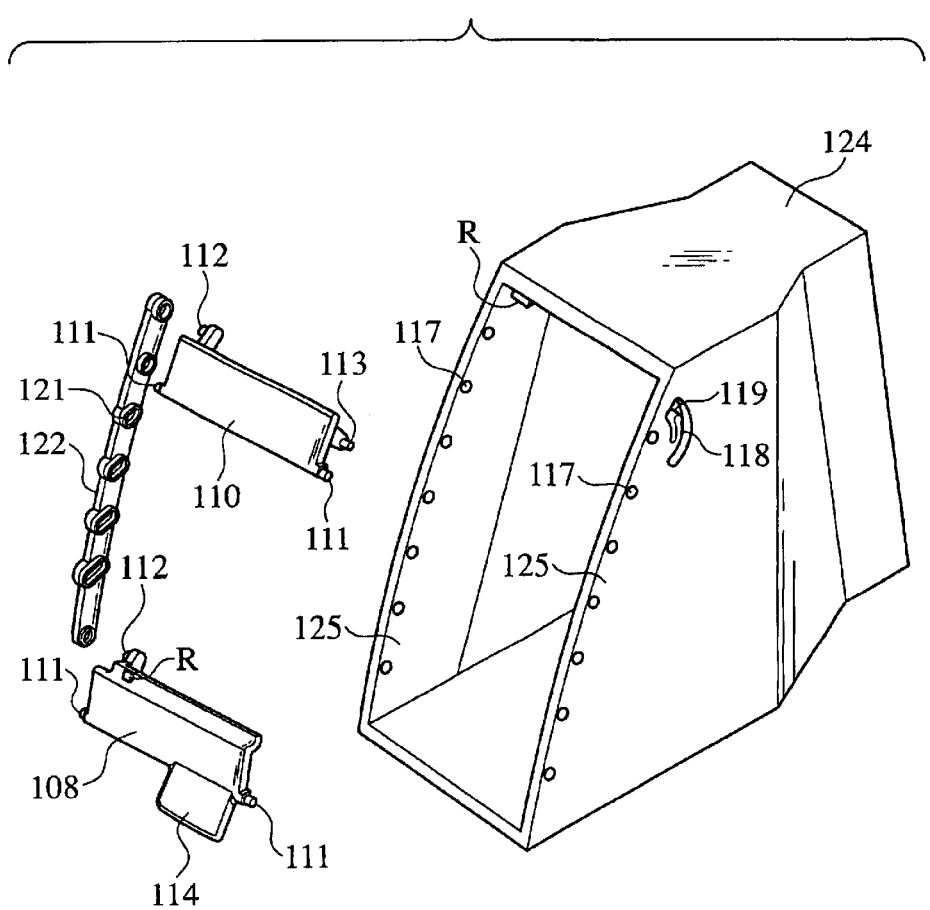
FIG. 17 is an exploded perspective view showing the ventilator according to a fifth embodiment of the present invention.

FIG. 17 is a diagram showing a fifth embodiment of the present invention. In the fifth embodiment, the shaft holes 117 and the elastic piece 118 are formed directly on the inner wall 125 of the case 124. This structure does not require a spacer, thereby reducing a number of parts. The other parts of the structure and the operation are the same as those in the third embodiment.

The entire contents of Japanese Patent Applications P2002-190592 (filed on Jun. 28, 2002) and P2002-312804 (filed on Oct. 28, 2002) are incorporated herein by reference.

Although the invention has been described above by reference to certain embodiments of the invention, the invention is not limited to the embodiments described above. Modifications and variations of the above embodiments will occur to those skilled in the art, in light of the above teachings. The scope of the invention is defined with reference to the following claims.

What is claimed is:

1. A ventilator, comprising:

a case formed with a supply opening, the case having walls opposite to each other formed respectively with a plurality of shaft holes arranged with predetermined intervals;

an operating louver having two longitudinal margins opposite to each other and two lateral ends opposite to each other, each one of the two lateral ends of the operating louver provided with a shaft pin respectively being inserted into the shaft holes, one end of the two lateral ends of the operating louver provided with an operating pin;

a train louver having two longitudinal margins opposite to each other and two lateral ends opposite to each other, each one of the two lateral ends of the train louver provided with a shaft pin respectively being inserted into the shaft holes, one end of the two lateral ends of the train louver provided with another operating pin; and a link formed with a plurality of operation holes receiving the operating pin of the operating louver and the operating pin of the train louver, the link transmitting motion of the operating louver to the train louver so that the operating louver and the train louver jointly shut the supply opening at swing limit of the operating louver in a manner such that one of the margins of the operating louver and one of the margins of the train louver meet each other, and a biasing device biasing the meeting state of the operating louver and the train louver and, wherein gaps (A) between the operation holes on the link are set so as to be larger than a gap (B) between a line connecting the shaft pins of operating louver and the operating pin of the operating louver, the operating pin of the operating louver being located at the one of the margins of the operating louver (A >B).

2. The ventilator according to claim 1, wherein a stopper unit for holding a turning position of the operating louver in the fully closed state by means of predetermined force is provided between the operating louver or the link and the inner wall of the supply opening.

3. The ventilator according to claim 1, wherein the one of the margins of the operating louver and the other one of the margins of the train louver are bent into a crank shape; and surfaces of the louvers in the fully closed state form a continuous surface.

4. The ventilator comprising:

a case formed with a supply opening, the case having walls opposite to each other formed respectively with a plurality of shaft holes arranged with predetermined intervals;

an operating louver having two longitudinal margins opposite to each other and two ends opposite to each other, each one of the two ends of the operating louver provided with a shaft pin respectively being inserted into one of the plurality of the shaft holes, one end of the two ends of the operating louver provided with an operating pin;

a train louver having two longitudinal margins opposite to each other and two ends opposite to each other, each one of the two ends of the train louver provided with a shaft pin respectively being inserted into another one of the plurality of the shaft holes, one end of the two ends of the train louver provided with another operating pin; and a link formed with a plurality of operation holes receiving the operating pin of the operating louver to the train louver so that the operating louver and the train louver jointly shut the supply opening at a swing limit of the operating louver in a manner such that one of the margins of the operating louver and one of the margins of the train louver meet each other; and a biasing device biasing the meeting state of the operating louver and the train louver and, wherein gaps (A) between the operation holes on the link are set so as to be larger than a gap (B) between a line connecting the shaft pins of the operating louver and the operating pin of the operating louver, the operating pin of the operating louver being located at the one of the margins of the operating louver (A >B) wherein the supply opening is curved in the longitudinal direction, and a lengths of the operation hole formed on the link for the operating pin of the train louver is longer in the air supply direction than the operation hole for the operating pin of the operating louver.

5. The ventilator comprising:

a case formed with a supply opening, the case having walls opposite to each other formed respectively with a plurality of shaft holes arranged with predetermined intervals;

an operating louver having two longitudinal margins opposite to each other and two ends opposite to each other, each one of the two ends of the operating louver provided with a shaft pin respectively being inserted into one of the plurality of the shaft holes, one end of the two ends of the operating louver provided with an operating pin;

a train louver having two longitudinal margins opposite to each other and two ends opposite to each other, each one of the two ends of the train louver provided with a shaft pin respectively being inserted into another one of the plurality of the shaft holes, one end of the two ends of the train louver provided with another operating pin; and a link formed with a plurality of operation holes receiving the operating pin of the operating louver and the operating pin of the train louver, the link transmitting motion of the operating louver to the train louver so that the operating louver and the train louver jointly shut the supply opening at a swing limit of the operating louver in a manner such that one of the margins of the operating louver and one of the margins of the train louver meet each other; and a biasing device biasing the meeting state of the operating louver and the train louver so that clearance between the operating louver and the train louver is reduced at the swing limit of the operating louver, wherein the biasing device includes:
 a stopper pin formed on the other end of one of the louvers; and
 an elastic piece whose tip comes in elastic contact with the stopper pin in the fully closed state of the louvers formed on one of the walls corresponding to the stopper pin.

6. The ventilator according to claim 5, wherein a guide surface for pushing the stopper pin to a closing direction by means of elastic force is formed on a portion at the tip of the elastic piece which comes in elastically contact with the stopper pin.

7. The ventilator according to claim 6, wherein the tip of the elastic piece has a curved side surface; and the guide surface is located on the curved side surface toward the closing direction from an apex farthest from the shaft pin.

8. The ventilator according to claim 5, wherein the stopper pin is formed on the train louver which is the farthest from the operating louver.

9. The ventilator according to claim 5, wherein ribs are formed on the other ends of the louvers curved into a crank shape, respectively; and the ribs come into contact with the one ends of the louvers adjacent to the other ends and so as to make surfaces of the louvers in the fully closed state as a continuous surface.

10. The ventilator according to claim 5, wherein the supply opening is curved in its longitudinal direction; and the operation hole for the operating pin of the train louver is longer in an air supply direction than the operation hole for the operating pin of the operating louver.

* * * * *